No. 885,052. PATENTED APR. 21, 1908.
J. J. JENSEN.
SPLIT WASHER.
APPLICATION FILED MAY 22, 1907.

Witnesses:
L. L. Simpson
Harry Opsahl.

Inventor:
Jens J. Jensen,
By his Attorneys:
Williamson & Merchant

UNITED STATES PATENT OFFICE.

JENS J. JENSEN, OF PORTLAND, NORTH DAKOTA.

SPLIT WASHER.

No. 885,052.

Specification of Letters Patent.

Patented April 21, 1908.

Application filed May 22, 1907. Serial No. 375,037.

*To all whom it may concern:*

Be it known that I, JENS J. JENSEN, a citizen of the United States, residing at Portland, in the county of Traill and State of North Dakota, have invented certain new and useful Improvements in Split Washers; and I do hereby declare the following to be a full, clear, and exact description of the invention, such as will enable others skilled in the art to which it appertains to make and use the same.

My invention has for its object to provide an improved split washer or collar, and to this end it consists of the novel devices and combinations of devices hereinafter described and defined in the claims.

As is well known, there are many places where an ordinary washer or collar can not be applied to a bolt or a shaft or removed therefrom by a sliding movement thereon without very considerable work. This is so where bolts or shafts are long and extend through various parts from which they can not be withdrawn or removed readily.

My improved washer or collar, hereinafter designated as a washer, is made up of two parts that are capable of separation, so that the sections of the washer may be applied edgewise around the intermediate portion of the bolt or shaft or removed therefrom by a reverse manipulation.

The improved washer is illustrated in the accompanying drawings, wherein like characters indicate like parts throughout the several views.

Figure 1:
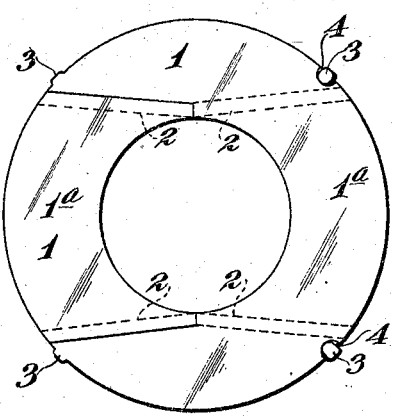
Figure 2:
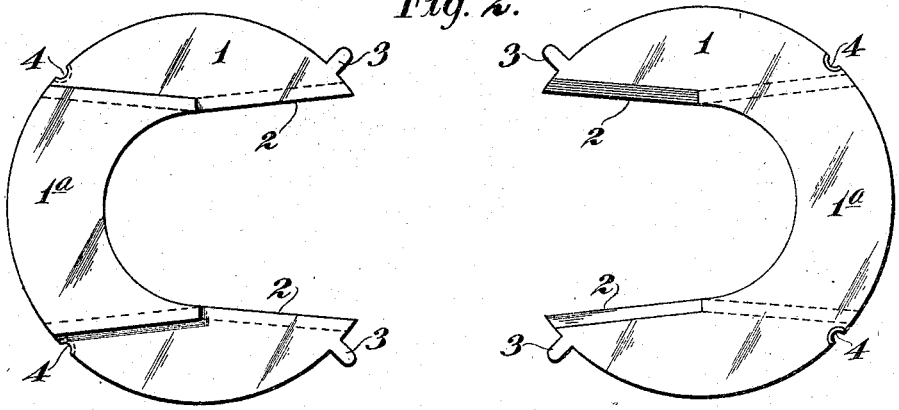
Figure 3:
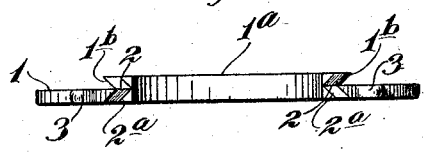

Referring to the drawings, Figure 1 is a plan view of the improved washer. Fig. 2 is a plan view of the washer, showing the sections thereof separated or drawn apart; and Fig. 3 is an edge elevation of the washer section on the left, as shown in Fig. 2.

The washer is made up of two duplicate segmental sections 1, one of which is cut away at one side on lines that extend tangentially to the inner edge of the washer section. These tangentially cut edges 2 might extend parallel to each other, but they are preferably flared outward slightly so as to provide an opening or gap that tapers inward. The relatively thick body portions $1^a$ of the washer sections are approximately twice as thick as the prongs thereof, and the said prongs are beveled in one direction, as indicated at $2^a$, (see Fig. 3) while the edges of the laterally projecting parts of said body sections $1^a$ are beveled in reverse directions, as indicated at $1^b$.

When the two washer sections are put together, the tapered and beveled edges $2^a$ of their prongs have dove-tailed engagements with the coöperating corresponding beveled and tapered edges $1^b$ of the relatively thick body portions $1^a$, and the two sections are then interlocked against separation except by edgewise movements. To complete the interlocking of the washer sections, each section, preferably near the extremities of their prongs, are formed with clenching lips 3 that are adapted to be bent over and engaged with notches or seats 4 formed in the respective washer sections over which they are bent, as shown in Fig. 1. When the two washer sections are thus interlocked together they make up a complete washer. To separate the said sections, it is of course necessary to first bend back the clenching lips 3 and then to pull the sections apart by edgewise movements at a right angle to the axis of the bolt or shaft to which they are applied. The washer sections may be constructed of any suitable metal but are preferably constructed of wrought iron or steel.

What I claim is:

1. A washer composed of two duplicate interlocking sections, each section consisting of two prongs united by a body portion forming an open sided recess, the body portion being thicker than the prongs and having undercut edges, and the prongs having beveled edges adapted to interlock with the undercut edges of the body portion, substantially as described.

2. A washer composed of two duplicate interlocking sections, each section consisting of two prongs united by a body portion forming an open sided recess, the body portion being thicker than the prongs and having undercut edges, and the prongs having beveled edges adapted to interlock with the undercut edges of the body portion, and a flexible lip on the marginal portions of each section for interlocking with the marginal portion of the other duplicate section, substantially as described.

In testimony whereof I affix my signature in presence of two witnesses.

JENS J. JENSEN.

Witnesses:
GEO. O. STOMNER,
W. E. INGLEHART.